June 12, 1973 D. L. DEAN Re. 27,666

BOAT FENDER STRUCTURES

Original Filed April 26, 1968

INVENTOR.
DUFF L. DEAN

Christie, Parker & Hale
ATTORNEYS.

United States Patent Office

Re. 27,666
Reissued June 12, 1973

27,666
BOAT FENDER STRUCTURES

Duff L. Dean, deceased, late of North Hollywood, Calif., by Jean C. Dean, executrix, Palo Alto, Calif.; said Dean assignor to Triple D Industries, Inc., Burbank, Calif.

Original No. 3,455,269, dated July 15, 1969, Ser. No. 732,481, Apr. 26, 1968, which is a continuation-in-part of Ser. No. 596,892, Nov. 25, 1966. Application for reissue June 11, 1971, Ser. No. 152,458
Int. Cl. B63b *21/00*
U.S. Cl. 114—219 10 Claims

Matter enclosed in heavy brackets [ ] appears in the original patent but forms no part of this reissue specification; matter printed in italics indicates the additions made by reissue.

ABSTRACT OF THE DISCLOSURE

A boat fender structure having several different bagged configurations of buoyant material one inside of the other. The inside configuration comprises relatively rigid, disc-shaped sections stacked one next to the other. The outer configurations comprise sheets of relatively resilient, buoyant material which are wrapped in the form of a spiral.

Cross-references to related applications

This is a divisional reissue of Pat. No. 3,455,269, which is a continuation-in-part of a copending application, Ser. No. 596,892, filed Nov. 25, 1965, now abandoned.

Background of the invention

This invention relates to boat fenders, and more particularly, to new structures in buoyant, watertight boat fenders.

For many years cocoa and rope mats, pieces of cork, and solid nonporous rubber have served as boat fenders. These structures have proved useful to reduce or eliminate damage upon collision of two boats or a boat with a dock by absorbing the impact in part and distributing it over a larger area, but they suffer from numerous shortcomings. For the most part, these fenders absorb water, are nonbuoyant and subject to fast wear, and lack the ruggedness and resilience to withstand for extended periods of time the tremendous impacts that are encountered in normal use.

Recently a boat fender structure has been developed that overcomes these shortcomings to a large extent. This structure comprises a hollow, rubber core around which sheets of buoyant resilient material are wound in the form of a spiral and cemented together. The resulting cylindrical body is bagged, so to speak, in a snug-fitting, watertight cover. Fixtures mounted at either end of the structure are connected by a steel cable running through the hollow interior of the core. In use these fenders are draped over the hull of the boat by lines secured to the fixtures. This fender structure has found wide acceptance because it is watertight, buoyant, rugged, and resilient. In addition, it is fire-resistant and easy to clean and repair.

This improved boat fender, however, is not particularly well suited for all applications. For example, a fender used on a tugboat that is pushing another boat transmits a large, relatively constant force between the tugboat and the other board for sustained periods of time. This application calls for a more rigid fender than applications involving short, intermittent impacts between boats. In other applications, boat fenders are required having large diameters. By increasing the diameter of a boat fender beyond a certain point, its strength with respect to axial forces is impaired. Large axial forces give rise to shear between the adjoining spiral surfaces of the buoyant material wrapped as a spiral inside of the fender. As a result, the outside layers tend to unravel in a direction parallel to the axis and the fender becomes permanently deformed or even completely destroyed.

Summary of the invention

According to the invention, fender structures suitable for the above-mentioned, as well as other, applications are provided. In one bagged structure, the buoyant material that surrounds the core is formed from rigid disshaped sections stacked one next to the other. This arrangement is capable of withstanding and transmitting large axial forces without deforming, due to the fact that the long dimension of each section of buoyant material is parallel to the applied force, much like the case of a structural beam. In addition, the stacked arrangement of sections obviates the need to bend sheets of the buoyant material. Thus, a buoyant material having high rigidity at normal temperatures can be selected without having to heat the material in order to bend it into a spiral unit.

In another structure, a bagged unit of buoyant material is utilized as a core around which sheets of buoyant material are wrapped in the form of a spiral unit and bagged in a watertight cover. More bagged spiral units of buoyant material can be added to the structure as desired. Thus, this fender structure comprises a plurality of bagged units of buoyant material one inside of the other, *in concentric relationship* which permits construction of fenders having a large cylindrical diameter without impairing the strength with respect to axial forces. The radial thickness of each spiral unit of buoyant material is maintained small enough so that the material does not tend to unravel upon exposure to the anticipated axial forces. The structure is built up to the desired diameter by simply adding more bagged units of buoyant material around the outside of the already existing structure.

In still another structure, several separately bagged units of buoyant material are provided that have different stress-strain characteristics. The buoyant material in the bagged units could be arranged in different configurations and/or have different degrees of resiliency. As a result, a wide range of control can be exercised over the stress-strain characteristics of the fender. In one embodiment, the innermost bagged unit is formed from a stacked configuration of rigid disc-shaped sections, as described above, while one or more outer units are formed from a spiral configuration of more resilient material. This embodiment provides large strain at small values of stress and less strain at increased values of stress. As a result, upon impact the fender provides a more gradual transfer of forces between colliding surfaces.

Brief description of the drawing

The features of specific embodiments of the invention are illustrated in the drawing, in which.

Description of specific embodiments

Figure 1:
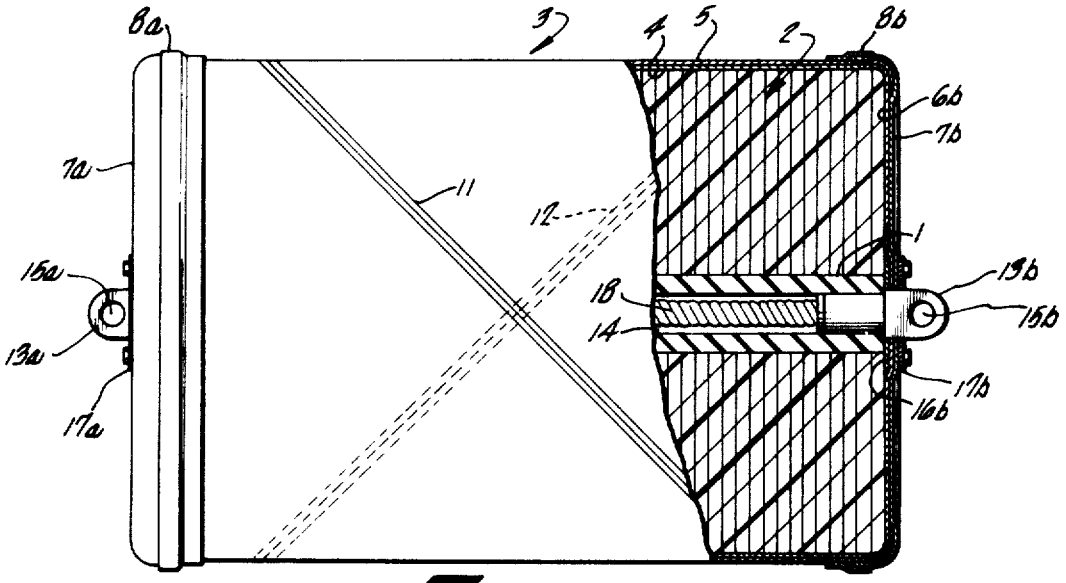
FIG. 1 is a side view partially in section of a fender structure having disc-shaped sections of buoyant material stacked one next to the other.

In FIG. 1 a fender structure is shown having a hollow core 1 with a passage 14 through it. Core 1 could be made, for example, of hard rubber. Disc-shaped sections of rigid, buoyant material comprising a unit 2 are stacked next to each other around core 1. The contiguous surfaces of the sections are cemented together. The buoyant material used to make the sections of unit 2 could be, for example, a polyvinylchloride foam such as Type AF Ensolite marketed by the United States Rubber Company. Core 1 and unit 2 are bagged in a snug-fitting, watertight, double cover 3 composed of several pieces. Cover 3 is watertight so that oil and other foreign substances do not penetrate through it to the interior of the fender. Thus, foreign substances remain on the surface of cover 3 and can be easily washed off. It is not essential, however, that cover 3 be watertight because the foam comprising the buoyant material has closed cells and therefore absorbs very little water. Rectangular pieces 4 and 5 are wrapped one on top of the other around the cylindrical surface fromed by the sections of unit 2. Circular pieces 6a, 6b, 7a, and 6b cover the end surfaces of the cylinder formed by sections 2. Pieces 6a, 6b, abut with the ends of piece 4. Pieces 7a, 7b overlap the ends of piece 5. Strips 8a, 8b of rubberized tape seal the joint between pieces 7a, 7b and piece 5, thereby sealing the structure. Cover 3 could be crossed, nylon tire cord coated with neoprene. Pieces 4 and 5 are oriented such that the cords run along the surface of the fender on the bias as represented by lines 11 and 12. Fixtures 13a, 13b are mounted on the ends of the fender. One end of fixtures 13a, 13b fits firmly into passage 14 of core 1, while the other end protrudes from the end surface of the fender. Holes 15a, 15b in fixtures 13a, 13b are employed to secure a line to the fender. Mounting plates 16a, 16b, which are integral parts of fixtures 13a, 13b, are sandwiched between pieces 6a, 6b and core 1. Cover plates 17a, 17b fit around the protruding part of fixtures 13a, 13b and are bolted to plates 16a, 16b. Tensile strength along the axis of the structure is provided by a steel cable 18 that connects fixtures 13a, 13b through passage 14. In use on a tugboat or in any other application requireing a rigid fender, unit 2 exhibits relatively little deformation upon the application of radial forces to the fender. Furthermore, since the sections of unit 2 need not be bent, very rigid materials can be employed without having to elevate the temperature during construction.

Figure 2:
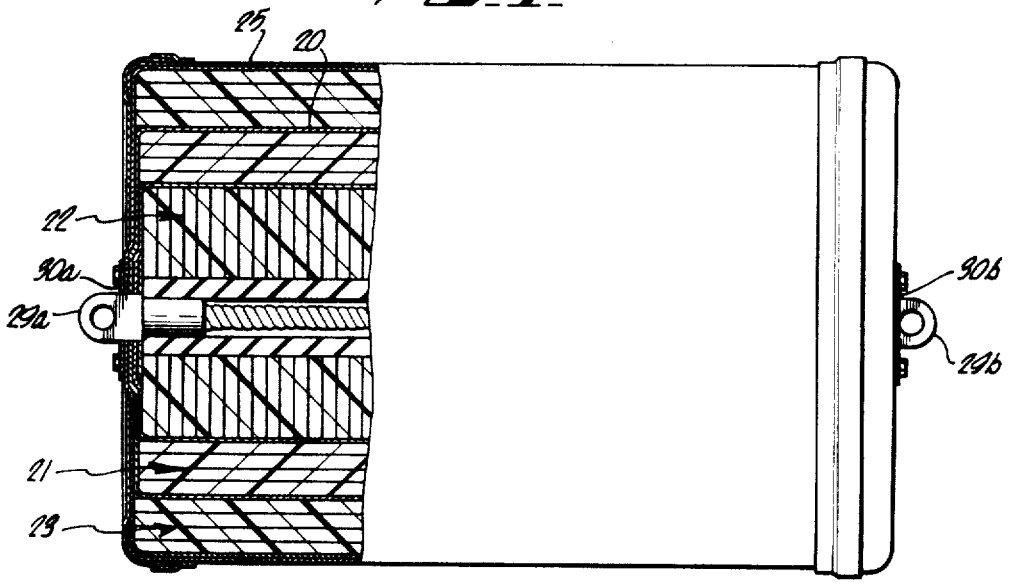
FIG. 2 is a side view partially in section of a fender structure employing the structure of FIG. 1 as a core around which sheets of buoyant material are wrapped.
Figure 3:
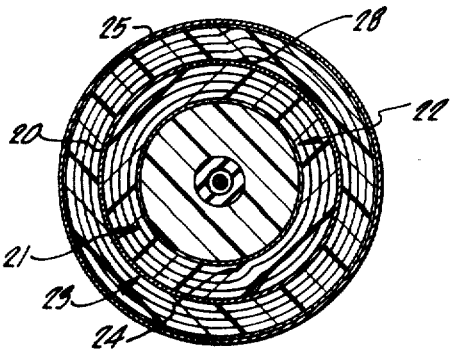
FIG. 3 is an end view in section of the structure of FIG. 2.

Reference is now made to FIGS. 2 and 3, in which another fender structure is shown. The fender structure of FIG. 1, designated as 22 in FIGS. 2 and 3, serves as a core in this structure. Sheets of buoyant material are wrapped around the perimeter of core 22 in the form of a spiral unit 21 that is bagged in a single cover 20. More strips of buoyant materials are wrapped around cover 20 to form a spiral unit 23. The entire structure is bagged in a sealed, watertight cover 25, similar in construction to cover 3 in FIG. 1. Cover plates 30a, 30b, analogous to plates 17a, 17b in FIG. 1, fit over cover 25 and around the protruding part of fixtures 29a, 29b. The sheets of units 21 and 23 are cemented to each other. As shown at points 24 and 28 in FIG. 3, the ends of the sheets cemented to the surface of core 22 and cover 20 are beveled to provide a smooth transition therebetween. The material of units 21 and 23 is preferably more resilient than the material of unit [*22*]. It could, by way of example be a polyvinylchloride foam material such as Type AL Ensolite marketed by the United States Rubber Company. Although the structure illustrated in FIGS. 2 and 3 involves three bagged units of buoyant material located one within the other, *in concentric relationship* the structure could be expanded to include any number of bagged units. The units could comprise any configuration or combination of configurations of buoyant material. By separately bagging portions of the buoyant material, it is possible to construct large diameter fenders having good strength against axial forces, because each cover lends added support to the buoyant material contained within it. Only the outermost cover need actually be watertight to prevent foreign substances from entering the interior of the fender.

In the fender structure shown in FIGS. 2 and 3, the cover that bags core 22 is preferably formed in a slightly different manner than cover 3 in the fender structure of FIG. 1 so as to lend additional axial strength. Specifically, this cover is preferably made so that nylon tire cord runs along the length of the fender, i.e. parallel to the axis of hollow core 1. As a result, the tire cord strengthens the fender structure so it withstands axial forces better. The neoprene-coated nylon tire cord is commercially available in sheets. The cords in each sheet are all parallel. The sheets are cut parallel to the cords to form strips that are used to form the cover. Each strip extends from one end of the unit of buoyant material it covers along the length of the unit, i.e. parallel to the axis of hollow core 1, and to the other end of the unit. The strips are cemented to the outer surface of the unit of buoyant material in overlapping relationship so that together they completely cover the buoyant material. Preferably, at least some of the ends of the strips are anchored to fixtures 29a, 29b. This could be done by cutting a hole in the ends of the strips to be anchored and placing the ends of these strips around fixtures 29a, 29b so the ends of the strips are clamped between the mounting plates and the cover plates, as depicted in FIG. 2. In addition, cover 25 is preferably constructed from three layers of neoprene-coated tire cords. The outer layer has cords running along the surface of the fender on the bias in the direction of lines 11 in FIG. 1. The middle layer is constructed like the previously described cover for core 22. In other words, the cords run along the length of the fender in the middle layer. The inner layer has cords running along the surface of the fender on the bias in the direction of lines 12.

In addition to having a plurality of bagged units of buoyant material, the structure of FIGS. 2 and 3 involves a combination of configurations of buoyant material, i.e. spiral units 21 and 23 and unit [*22*] of stacked, disc-shaped sections. The use of a more resilient material for units 21 and 23 than for unit [*22*] and the arrangement of the material in different configurations yield different stress-strain characteristics for units 21 and 23 than for unit [*22*]. *Units 21 and 23 have less stress per unit strain than unit 22.* By varying these factors, i.e. the resiliency of the materials and their configurations, control may be exercised over the resultant stress-strain characteristics of the fender structure. Thus, the particular fender structure of FIGS. 2 and 3 exhibits large rate of change of strain upon initial application of stress and a decreased rate of change of strain for larger stress. As a result, the fender provides a more gradual transfer of forces between the colliding boats upon impact.

Preferably, the fender structures of the invention would have circular cross sections as shown in FIG. 3. It is conceivable, however, that fender structures employing the principles of the invention could be constructed with oval cross sections. Thus, the term "disc-shaped sections" is to be understood as including not only circular sections but oval sections as well.

As a final step in the construction of the described fenders, it is preferable to heat them under pressure so that the various parts fuse together to some extent. The pressure could be provided by encapsulating the fenders in steel drums during heating. The drums confine the fenders to their original size as the buoyant material expands in the course of the application of heat, thereby generating pressure.

What is claimed is:

[1. A boat fender comprising:

a plurality of rigid, buoyant, disc-shaped sections stacked one next to the other as a first unit;

a first cover fitting snugly around the first unit;

a second unit of buoyant material surrounding the first cover; and a second cover fitting snugly around the second unit of buoyant material.]

2. The boat fender of claim [1,] *18* in which the second unit comprises sheets of bouyant material wrapped around the first cover in a spiral configuration.

3. The boat fender of claim 2, in which the buoyant material of the second unit *has less stress per unit strain* [is more resilient] than the buoyant material of the first unit.

4. The boat fender of claim [1] *18* in which the buoyant material of the second unit *has less stress per unit strain* [is more resilient] than the buoyant material of the first unit.

5. The boat fender of claim [1,] *18* in which the second cover is watertight.

[6. A boat fender comprising:
a first unit of buoyant material;
a first cover fitting snugly around the first unit of buoyant material;
a second unit of buoyant material surrounding the first cover;
a second cover fitting snugly around the second unit of buoyant material;
a third unit of buoyant material surrounding the second cover; and
a third cover fitting snugly around the third unit of buoyant material.]

7. The boat fender of claim [6,] *19* in which the third cover is watertight.

8. The boat fender of claim [6,] *19* in which at least two of the units of buoyant material have different stress-strain characteristics.

[9. A boat fender comprising:
a hollow core having a passage through it;
a first unit of solid buoyant material disposed around the core;
a second unit of solid buoyant material surrounding the first unit, and second unit of buoyant material having different stress-strain characteristics than the first unit of buoyant material;
a cover fitting snugly around the second unit of buoyant material;
a pair of fixtures protruding outwardly from the cover at the ends of the passage of the core; and
an elongated member connecting the fixtures through the passage of the core to provide tensile strength.]

[10. The boat fender of claim 9, in which the buoyant material of one unit is more resilient than the buoyant material of the other unit.]

[11. The boat fender of claim 9, in which the buoyant material of the second unit is more resilient than the buoyant material of the first unit.]

[12. The boat fender of claim 9, in which the buoyant material of the first unit has a different configuration from the buoyant material of the second unit.]

[13. The boat fender of claim 12, in which the first unit is configured of a plurality of rigid disc-shaped sections stacked one next to the other around the core.]

[14. The boat fender of claim 13, in which the second unit comprises sheets of resilient material wrapped around the first unit in a spiral configuration.]

[15. The boat fender of claim 12, in which the second unit comprises sheets of resilient material wrapped around the first unit in a spiral configuration.]

16. The boat fender of claim 3, in which the disc-shaped sections of the first unit are disposed around a hollow core having a passage through it, a pair of fixtures that protrude outwardly from the second cover are mounted at the ends of the passage of the core, and an elongated member providing tensile strength connects the fixtures through the passage of the core.

17. The boat fender of claim [6,] *19* in which the first unit of buoyant material is disposed around a hollow core having a passage through it, a pair of fixtures that protrude outwardly from the third cover are mounted at the ends of the passage of the core, and an elongated member providing tensile strength connects the fixtures through the passage of the core.

*18. A boat fender comprising:*
*a plurality of rigid, buoyant disc shaped sections stacked one next to the other as first unit;*
*a first cover fitting snugly around all the surfaces of the first unit, the first cover being a different material from the first unit;*
*a second unit of buoyant material surrounding the first cover in concentric relationship with the first unit; and*
*a second cover fitting snugly around all the surfaces of the second unit of buoyant material, the second cover being a different material from the second unit.*

*19. A boat fender comprising:*
*a first unit of buoyant material;*
*a first cover fitting snugly around all surfaces of the first unit of buoyant material, the first cover being a different material from the first unit;*
*a second unit of buoyant material surrounding the first cover in concentric relationship with the first unit;*
*a second cover fitting snugly around all the surfaces of the second unit of buoyant material, the second cover being a different material from the second unit;*
*a third unit of buoyant material surrounding the second cover in concentric relationship with the first and second units; and*
*a third cover fitting snugly around all the surfaces of the third unit of buoyant material, the third cover being a different material from the third unit.*

References Cited

The following references, cited by the Examiner, are of record in the patented file of this patent or the original patent.

UNITED STATES PATENTS

| | | | |
|---|---|---|---|
| 3,113,546 | 12/1963 | Mountcastle | 114—219 |
| 1,815,413 | 7/1931 | Lockwood | 114—219 |
| 3,033,151 | 5/1962 | Sheehan | 114—219 |
| 2,716,758 | 9/1955 | Hajecate | 9—8 R |
| 1,049,261 | 12/1912 | Pélissier | 114—219 |

FOREIGN PATENTS 978,847 12/1964 Great Britain.

MILTON BUCHLER, Primary Examiner

G. W. O'CONNOR, Assistant Examiner